April 7, 1931.    G. SCHILLING ET AL    1,799,394
ANIMAL TRAP
Filed Feb. 15, 1930    2 Sheets-Sheet 1
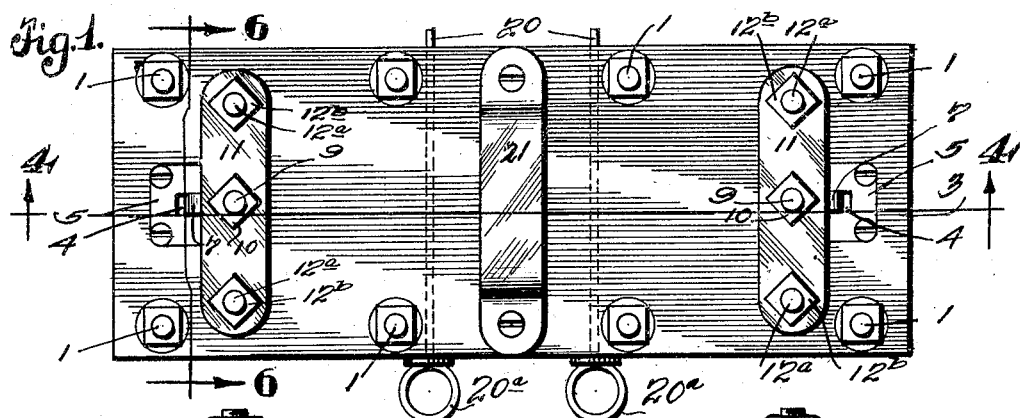
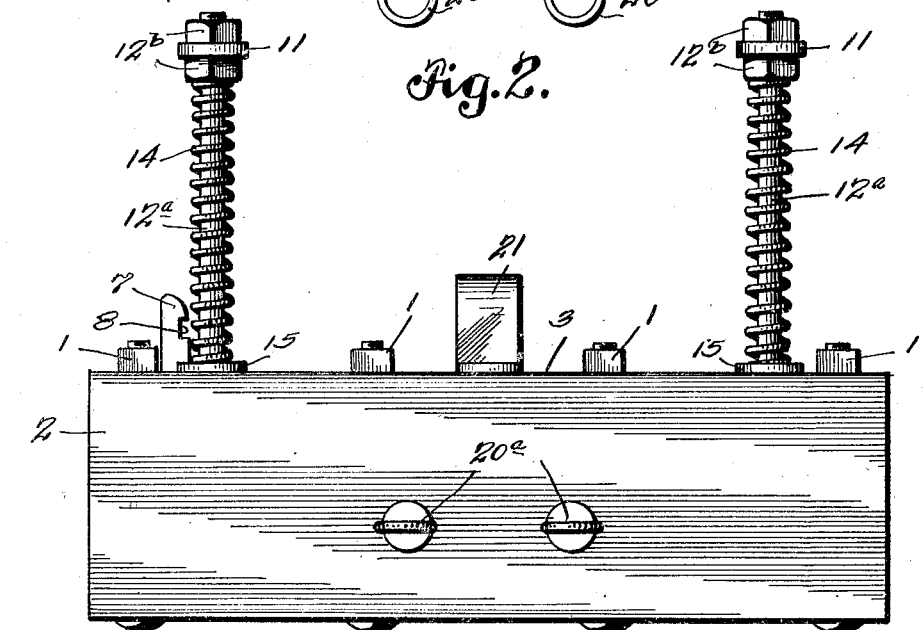
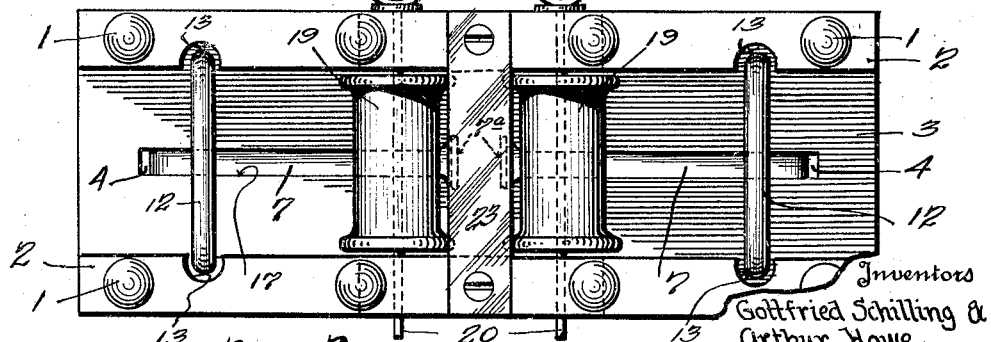
Inventors
Gottfried Schilling &
Arthur Howe.
By Milo B. Stevens Co.
Attorney

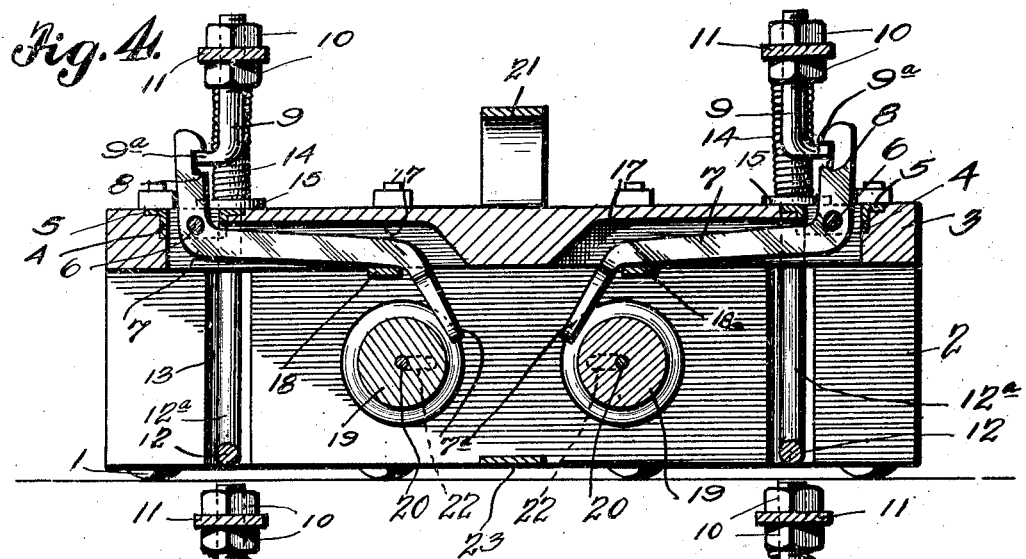

Patented Apr. 7, 1931

1,799,394

UNITED STATES PATENT OFFICE

GOTTFRIED SCHILLING AND ARTHUR HOWE, OF PRESCOTT, WISCONSIN

ANIMAL TRAP

Application filed February 15, 1930. Serial No. 428,790.

Our invention relates to improvements in animal traps and has for its primary object to provide a highly efficient and improved trap which is very positive in operation, comparatively simple in construction, in that it contains no parts which are likely to get out of order, and which further, is very humane in its action, since the animals caught therein will be instantly killed.

A further object of the invention is to provide a trap incorporating novel bait actuated releasing means.

A further object of the invention is to provide a trap of this kind which can be set without likelihood of the operator catching his fingers.

A still further object of the invention is to provide novel means for holding the bait and whereby the same can be removed without putting the hand inside the trap.

The invention also resides in certain novel features of construction, combination and arrangement of the various parts and in modes of operation, all of which will be readily apparent to those skilled in the art upon reference to the accompanying drawings in connection with the detailed description to follow.

While the preferred form of the invention has been disclosed herein,—yet it will be understood that same is capable of other mechanical expressions within the spirit and scope of the subject matter claimed hereinafter.

In the drawings,

Figure 1 is a top plan view of a trap incorporating our invention;

Figure 2 is a side elevational view;

Figure 3 is a bottom plan view of the device;

Figure 4 is a longitudinal sectional view showing the trap set;

Figure 5 is a longitudinal sectional view similar to Figure 4, but showing the trap sprung;

Figure 6 is a cross sectional view taken on the line 6—6 of Figure 1;

Figure 7 is a perspective view of one of the bait carrier members, and,

Figure 8 is a perspective view of one of the bait carrier securing members.

Referring specifically to the drawings, wherein the same reference characters have been used to designate the same parts in all views,—it will be seen that the trap comprises side members 2 and a top member 3 bolted together, as at 1.

The top member 3 is provided adjacent each end with a slot 4 in which is socketed a frame 5 carrying the pivot 6 of a tirp member 7 having its upwardly extending arm provided with a notch 8 adapted to engage the lateral end $9^a$ of a lug or bolt member 9 which is secured to a cross bar 11 by means of nuts 10 disposed upon the member 9 at either side of such cross bar.

The trip member 7 and associated parts are duplicated as shown and each cross bar 11 is carried by the legs $12^a$ of U-shaped members 12,—the legs $12^a$ extending through the top 3 of the trap and being received in side guides 13 of the side members 2, as shown. It will be clear that upward movement of the U-shaped members 12 will catch an animal and crush him against the under surface of the top 3.

The legs $12^a$ of the U-shaped members 12 are secured to the cross members 11 by bolts $12^b$ disposed upon either side of such cross members. Each member 12 has its legs provided with coil springs 14, one end of which seats against washers 15 surrounding the legs 12, while the other ends bear against the lower nut $12^b$. Naturally the action of the springs is to push the legs $12^a$ upwardly so as to draw the bight portions of the U-shaped member 12 against the under surface of the top member 3, as already described.

As shown the horizontal portions of the trip members 7 are received in under surface recesses 17 of the top member 3,—the cross members 18 serving to limit downward movement of the lateral ends $7^a$ of the trip members so that the notched end 8 of the trip members will be always disposed in a position to be engaged by the lateral end $9^a$ of the member 9 when the U-shaped members 12 are forced downwardly from the position shown in Figure 5 to that shown in Figure 4.

The lateral or downwardly extending ends 7ª of the trip members 7,—incidentally referred to hereinabove,—are adapted to rest upon the bait members 19, which may be of edible material or which may carry edible material, such as bacon rind. The bait members 19 are, or may be, in spool-like form, as shown, and carried upon rods 20 insertible through longitudinal slots 22 in the opposite sides 2 of the device.

When the bait members 19 are moved outwardly to the limits of slots 22, the interengagement of the trip and lug portions 8, 9ª, will be maintained, as in Figure 4. However, when the bait portions 19 are forced inwardly they will engage the lateral portions 7ª of trip members 7 so as to swing the notched portions 8 thereof outwardly to release the lug end 9ª so that the member 12 confined thereby will be forced sharply upward by the action of its spring 14 to crush the animal between the bight portion of member 12 and the under surface of the top of trap, as indicated in Figure 5.

For purposes of rigidity a cross member 23 may be disposed at the bottom of the trap intermediate the ends thereof. Also a handle 21 may be provided at the top of the trap.

It is believed to be clearly apparent that a very efficient and satisfactory trap is provided by the construction illustrated and described herein. The trip members 7 can be bodily removed by simply removing the screws which secure the socket portions 5 in the recesses 4.

The trap has proven very efficient in the catching of animals, such as weasels, rats, mice, in addition to muskrats and other fur bearing animals.

When it is desired to remove one of the U-shaped members 12 it is simply necessary to remove bolts 12 and the member can be simply dropped out of place. The device can be chiefly made of wood and its manufacture does not require the use of unusual skill.

Having thus described our invention, what we claim as new and desire to secure by Letters Patent is:

1. A trap comprising side and top members, a releasable animal engaging member having actuating means, latch means for holding said animal engaging member in set position and being disposed above the top of the trap, and bait mounting means insertible through and supported by the side members of the trap and movable in the direction of the length of the trap, bait carried by such means, and releasing means for said latch normally engaging said bait.

2. A trap comprising side and top walls providing an end entrance, said side walls having opposed lineal slots, bait carrying means insertible through said slots and supported therein for limited movement in the direction of the length of the trap, driven animal engaging means adjacent said bait supporting means and between the same and the trap entrance, cooperating latch and stop means above the top of the trap for holding the animal engaging means in set position, and said latch having a portion engaging said bait support whereby to release said latch when the bait support is moved away from the trap entrance.

3. A trap comprising side and top walls providing an end entrance, bait carrying means mounted for limited movement in the direction of the length of the trap, driven animal engaging means adjacent said bait supporting means and between the same and the trap entrance, cooperating latch and stop means above the top of the trap for holding the animal engaging means in set position, said latch having a portion engaging said bait support whereby to release said latch when the bait support is moved away from the trap entrance, and said bait engaging latch portions automatically moving said bait carrier toward said entrance when the latch is engaged with said lugs to set the trap.

4. A trap comprising side and top walls providing an end entrance, bait carrying means mounted for limited movement in the direction of the length of the trap, driven animal engaging means adjacent said bait supporting means and between the same and the trap entrance, cooperating latch and stop means above the top of the trap for holding the animal engaging means in set position, said latch having a portion engaging said bait support whereby to release said latch when the bait support is moved away from the trap entrance, and said bait support being removable and accessible from one side of the trap.

In testimony whereof we affix our signatures.

GOTTFRIED SCHILLING.
ARTHUR HOWE.